May 5, 1931.  R. C. SHAND  1,803,359
OIL DISPENSING DEVICE
Filed Sept. 17, 1928  2 Sheets-Sheet 1
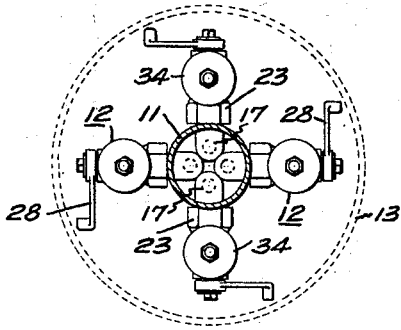
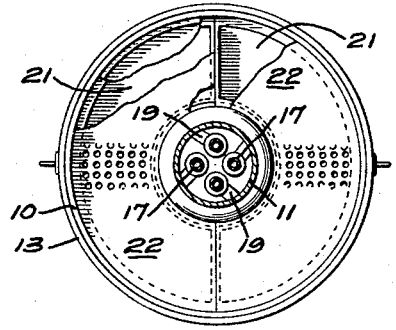
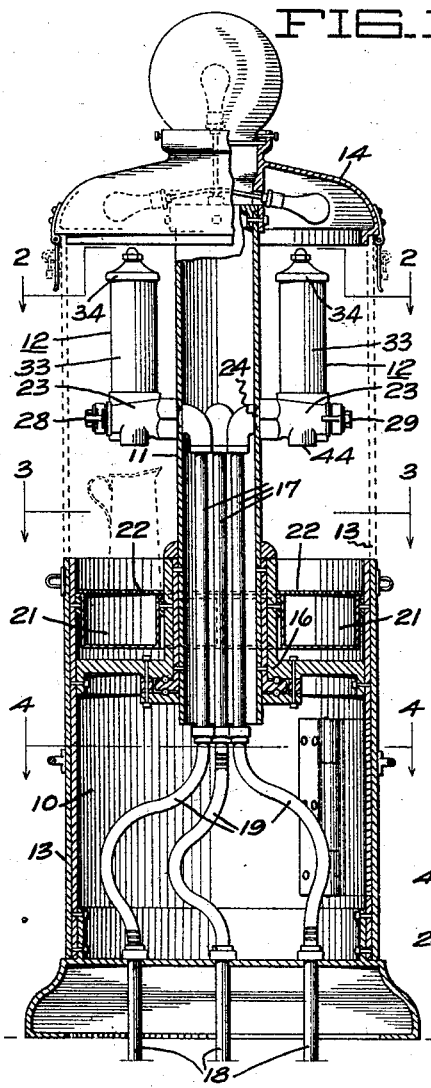
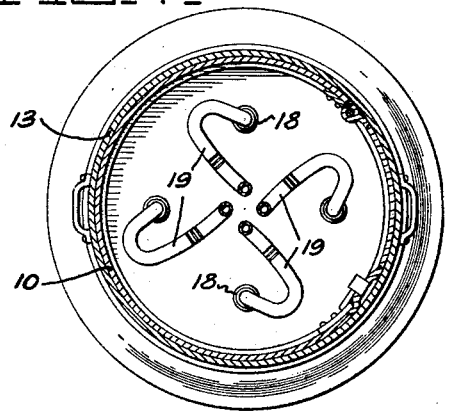
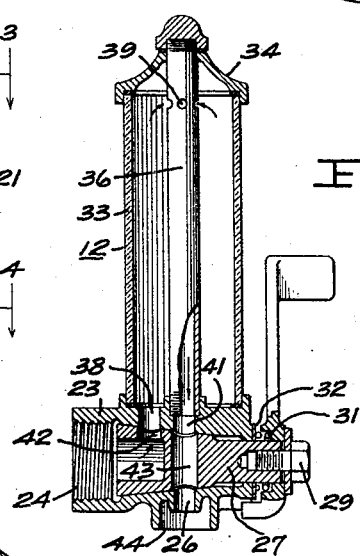
INVENTOR:
Reginald C. Shand
BY
White, Prest & Fryer
ATTORNEYS.

May 5, 1931.  R. C. SHAND  1,803,359
OIL DISPENSING DEVICE
Filed Sept. 17, 1928   2 Sheets-Sheet 2
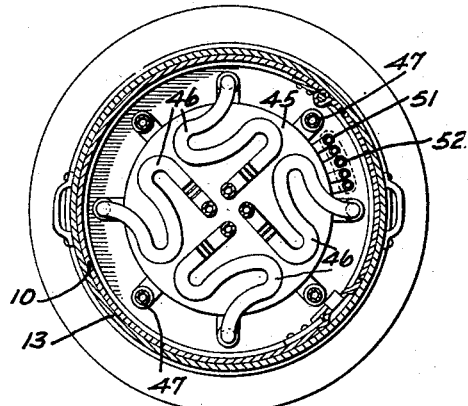
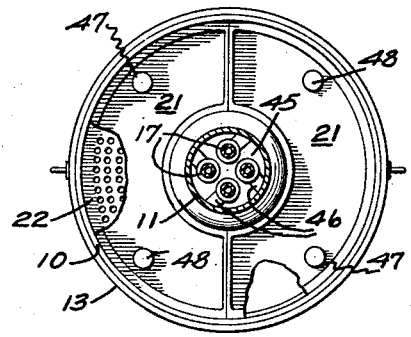
FIG.7.   FIG.8.
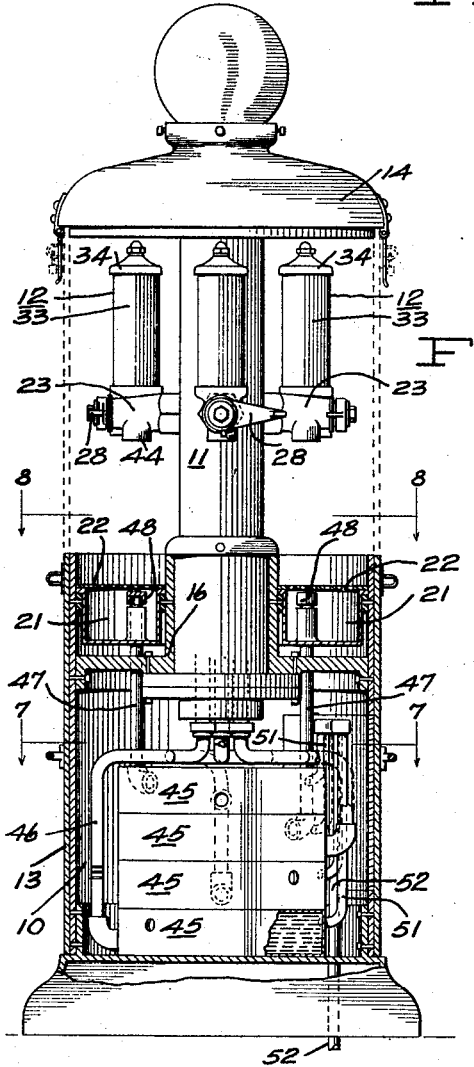
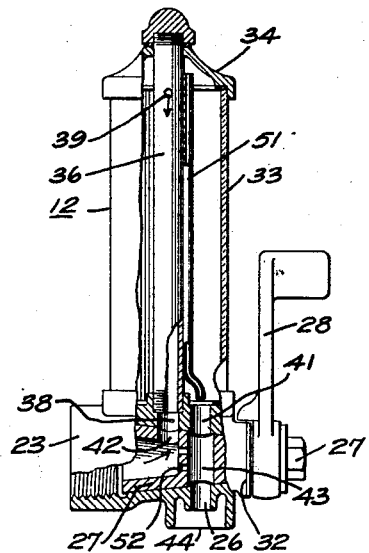
FIG.6.   FIG.9.
INVENTOR:
Reginald C. Shand
BY
White, Prost, Fryer
ATTORNEYS.

Patented May 5, 1931

1,803,359

UNITED STATES PATENT OFFICE

REGINALD C. SHAND, OF BERKELEY, CALIFORNIA

OIL-DISPENSING DEVICE

Application filed September 17, 1928. Serial No. 306,447.

This invention relates generally to a device for dispensing various lubricating oils and is particularly adapted for use with oil and gasoline filling stations.

It is an object of this invention to construct a novel device capable of dispensing any one of a plurality of grades of lubricating oils.

It is a further object of this invention to devise a dispensing apparatus having a plurality of dispensing units for different grades of oil, and which has a construction which facilitates access to the various units.

It is a further object of this invention to devise a novel dispensing unit utilizing a glass or transparent indicating vessel thru which the oil being dispensed is caused to flow.

It is a further object of this invention to devise a dispensing unit in which the transparent indicating vessel is not subjected to oil pressure during times when the operating valve of the unit is in off position.

It is a further object of this invention to devise a dispensing unit incorporating means for preventing accumulation of air within the upper portion of the transparent indicating vessel.

Further objects of the invention will appear from the following description in which I have set forth the preferred embodiment of my invention. It is to be understood that the appended claims are to be accorded a range of equivalents consistent with the state of the prior art.

Figure 1 is a side elevational view partly in cross section illustrating an apparatus incorporating certain principles of my invention.

Figure 2 is a cross sectional view taken along the line 2—2 of Fig. 1.

Figure 3 is a cross sectional view taken along the line 3—3 of Fig. 1.

Figure 4 is a cross sectional view taken along the line 4—4 of Fig. 1.

Figure 5 is a side elevational view of one of the oil dispensing units incorporated in the apparatus of Fig. 1, certain parts being shown in cross section.

Figure 6 is a side elevational view of a machine somewhat similar to the apparatus of Fig. 1, but incorporating certain modified features.

Figure 7 is a cross sectional view taken along the line 7—7 of Fig. 6.

Figure 8 is a cross sectional view taken along the line 8—8 of Fig. 6.

Figure 9 is a side elevational view of a dispensing unit of modified construction.

The apparatus which I have illustrated in Fig. 1 incorporates in general a suitable supporting structure 10 upon which is mounted a vertical standard 11 carrying a plurality of circumferentially spaced dispensing units 12. The supporting structure 10 has been shown as cylindrical in shape altho it may be of any suitable form such as square or octagonal, and it preferably carries an outer slidable jacket 13 which can be raised and latched upon a cover 14, to prevent access to the dispensing units.

Standard 11 is preferably journaled to the supporting structure 10 as by means of a journal 16, so that the standard together with the dispensing units 12 can be rotated about a vertical axis. This construction facilitates operation of the device since an operator standing in one position can dispense oil from any one of the units 12 by rotating the standard 11. The various dispensing units are separately connected to different tanks so that they can be employed for dispensing different grades of oil. For this purpose I prefer to employ pipes 17 communicating with the different units 12 and extending down into the interior of structure 10 thru the hollow standard 11. Pipes 18 which communicate with the various oil tanks are connected to pipes 17 thru flexible pipe sections 19. The use of flexible pipe sections is a simple means of permitting free rotation of standard 11 thru at least 360°, altho it is to be understood that other expedients can be employed. In order to collect oil which may be spilled or dripped from the dispensing units 12, I have shown a drip pan 21 removably positioned within the upper portion of the supporting structure 10, and these pans are preferably covered by a removable sectional screen 22.

One novel form of dispensing unit which I can incorporate in the apparatus of Fig. 1, is shown in Fig. 5. This unit consists of a body member 23 having an inlet opening 24 for connection with pipes 17 or some other source of oil under pressure, and a discharge opening 26 thru which the oil is dispensed. Formed within the body member 23 there is a tapered valve seat within which is fitted a tapered rotatable valve plug 27. A manually operable lever 28 is secured to the outer end of plug 27 as by means of a cap screw 29, and the plug is normally resiliently urged against its seat by means of a compression spring 31. One end of spring 31 seats upon the inner face of lever 28 while the other end is shown seated upon a suitable thrust washer 32, the washer being preferably of fiber or like material.

Mounted upon the upper face of body member 23, there is a visual indicating vessel of transparent material such as glass. The upper end of this cylinder is closed by suitable metal cap 34, and the assembly of the vessel 33 and cap 34 is clamped together and to the body member 23 by means of a central pipe 36.

In order to cause flow of oil thru the vessel 33, body member 23 has an inflow opening 38 communicating with the lower portion of vessel 33, while the upper end of the vessel is in communication with the interior of pipe 36 thru one or more openings 39. The lower portion of pipe 36, which is preferably threaded into body member 23, communicates with an outflow opening 41.

In order to control flow of oil from the discharge opening 26, the valve plug 27 is preferably provided with two ports 42 and 43. Port 42 serves to establish or interrupt communication between inlet opening 24 and the inflow opening 38 to the vessel 33, while port 43 serves to interrupt or establish communication between the outflow opening 41 and the discharge opening 26. The positioning of these ports is such that with the plug 27 in one position, as for example as that shown in Fig. 5, oil is free to flow from the inlet opening 24 to the inflow opening 38 thru port 42, and from vessel 33 the oil can flow thru opening 39, down thru the central pipe 36 and out the discharge opening 26 by way of opening 41 and port 43. When lever 28 is moved to closed position or the plug 27 moved thru an angle of say 90° from that shown in Fig. 5, communication between the inlet opening 24 and vessel 33 is interrupted, and likewise communication between vessel 33 and the discharge 26 is interrupted. The fact that rotation of the plug 27 interrupts communication between the inlet 24 and the glass vessel 33 is a distinct advantage, since when the valve is in closed position, the vessel is not subjected to the pressure of oil from the source to which the unit is connected. Thus if the vessel should become broken, the large quantities of oil would not be discharged as would be the case of inflow 24 and the glass vessel were in continuous communication. Furthermore, because of the absence of high pressure the glass vessel is less apt to be broken. To prevent subjecting oil pressure to vessel 33, while the plug is being rotated from open to closed position port 42 cuts off communication between the vessel and inflow 38 before communication is interrupted between the vessel and discharge 26.

It is characteristic of the dispensing unit shown in Fig. 5 that an air pocket will not accumulate in the upper end of the indicating vessel 33. If air is introduced thru the inlet 24 with the oil it is immediately discharged thru the opening 39.

In many instances I have found that it is desirable to provide an annular shoulder 44 about the discharge opening 26, the lower edge of this opening extending a substantial distance below the lower edge of opening 26. This construction seems to aid in producing a solid and even stream of oil.

In Figs. 6, 7, and 8 I have shown a modified form of the apparatus as shown in Figs. 1, 2 and 3. In this case, instead of employing tanks which are positioned at remote points from the dispensing apparatus, a plurality of tanks 45 are positioned within the supporting structure 10. These tanks have individual flexible pipe connections 46 with pipes 17 positioned within hollow standard 11. In order to permit filling of these tanks there is provided a series of pipes 47 which extend into the upper portion of supporting structure 10 and which are provided with removable filling caps or plugs 48. Oil is preferably forced from the various oil tanks by air pressure supplied by series of air pipes 51, these pipes connecting to a common source of air thru pipe 52.

In Fig. 9 I have shown a modified form of the dispensing unit of Fig. 5. In this case the lower end of central pipe 36 communicates with the inflow opening 38, while the lower portion of vessel 33 communicates with the outlet opening 41. In order to prevent accumulating of air within the upper end of vessel 33 I have provided a small tube or pipe 51 having its upper open end communicating with the upper end of vessel 33 and its lower end terminating near or within the outflow opening 41. If air is introduced into vessel 33 it is immediately removed thru pipe or tube 51 when the valve is in open position. In this form I have also shown one or more small openings 52 communicating between ports 42 and 43. These openings serve to by-pass a certain amount of oil directly from the inlet opening 24 to the discharge opening 26, thus increasing the effective rate of flow.

I claim:

1. An oil dispensing device comprising a transparent vessel having separate inflow and outflow openings communicating with the same, a body member communicating with said openings, said body member having an inlet opening for communication with a source of oil under pressure and also a discharge opening, and valve means associated with said body member for controlling flow of oil from said source into said vessel and from said vessel thru said discharge opening, and a single operating member for said valve means, said valve means in one position of the operating member serving to establish communication between said inlet and inflow openings and communication between said outflow and discharge openings and in another position serving to interrupt communication between said inlet and inflow openings and communication between said outflow and discharge openings.

2. An oil dispensing device comprising a body member having oil inlet and discharge openings, a transparent vessel mounted upon said body member and extending vertically from the same, said body having an inflow opening communicating with the lower end of the vessel and an outflow passage extended from said body to the upper portion of said vessel, and valve means associated with said body for positively controlling flow of oil thru the inflow opening and the outflow passage in the body and thru said vessel.

3. An oil dispensing device comprising a body member having an inlet opening for connection to a source of oil under pressure, and having a discharge opening, a transparent vessel having its lower end mounted upon and supported by said body, said body also having an inflow opening communicating with the lower portion of the vessel and an outflow opening for oil from the vessel, a pipe communicating with the outflow opening and extending within the vessel to the upper end thereof, the upper end of the pipe being open to the vessel, and a ported rotatable valve plug disposed within said body, said plug serving in one position to establish communication between said inlet and inflow openings and communication between said outflow and discharge openings and serving in another position to interrupt communication between said inlet and inflow openings and communication between said outflow and discharge openings.

4. An oil dispensing device comprising a base structure, a hollow standard mounted for rotation with respect to said base, a plurality of pipes extending within said standard from sources of fluid, and a plurality of dispensing units positioned on said standard and in communication with said pipes.

5. An oil dispensing device comprising a valve body member having an inlet opening for connection to a source of oil under pressure, a transparent vessel mounted upon and supported by said body, said body having passages for establishing communication with said vessel, an open pipe extending into the vessel from one of the passages, and a manually operable valve plug disposed in said body for controlling said communication.

6. An oil dispensing device comprising a supporting casing, a hollow standard mounted upon said casing, a plurality of dispensing units mounted on the standard for rotation with respect to the casing, a plurality of oil tanks, and means extending through the hollow standard for establishing communication between the dispensing units and the oil tanks.

In testimony whereof, I have hereunto set my hand.

REGINALD C. SHAND.